(12) United States Patent  (10) Patent No.: US 8,833,311 B2
Kostelec  (45) Date of Patent: Sep. 16, 2014

(54) PROTECTIVE HOOD FOR DOGS AND OTHER ANIMALS

(76) Inventor: Diane Kostelec, Concord, CA (US)

( * ) Notice: Subject to any disclaimer, the term of this patent is extended or adjusted under 35 U.S.C. 154(b) by 0 days.

(21) Appl. No.: 12/792,123

(22) Filed: Jun. 2, 2010

(65) Prior Publication Data

US 2011/0297107 A1  Dec. 8, 2011

(51) Int. Cl.
  *A01K 13/00* (2006.01)
  *B68C 5/00* (2006.01)
(52) U.S. Cl.
  CPC .................................... *A01K 13/006* (2013.01)
  USPC ........................................... 119/850; 54/80.1
(58) Field of Classification Search
  CPC ...... A01K 13/006; A01K 13/008; B68C 5/00; B68C 2005/005
  USPC ......... 119/814, 821, 823, 827, 831, 832, 837, 119/850, 856; 54/80.4–80.5, 80.1, 80.2; 2/202, 204, 174
  See application file for complete search history.

(56) References Cited

U.S. PATENT DOCUMENTS

| | | | |
|---|---|---|---|
| 584,947 A * | 6/1897 | Lundborg | 119/836 |
| 1,004,507 A | 9/1911 | Waltz | |
| 2,191,589 A * | 2/1940 | Sacks | 2/174 |
| 2,372,715 A * | 4/1945 | Ernst | 2/174 |
| 2,436,249 A * | 2/1948 | Clement | 128/201.25 |
| 2,447,561 A * | 8/1948 | Brenner | 2/174 |
| 2,685,091 A * | 8/1954 | Thill | 2/204 |
| 3,505,678 A * | 4/1970 | Key | 2/4 |
| 3,753,334 A | 8/1973 | Blessing | |
| 5,163,272 A | 11/1992 | Finley | |
| 5,172,426 A * | 12/1992 | Capello | 2/81 |
| 5,367,706 A | 11/1994 | Davidson | |
| 5,456,215 A * | 10/1995 | Deutscher et al. | 119/850 |
| 5,832,538 A * | 11/1998 | Williams | 2/202 |
| 6,128,891 A * | 10/2000 | McMahon | 54/80.1 |
| 6,216,642 B1 * | 4/2001 | Hung | 119/850 |
| 6,227,148 B1 * | 5/2001 | Wexler | 119/837 |
| 6,382,140 B2 | 5/2002 | Wexler | |
| 6,574,948 B2 * | 6/2003 | Longtin | 54/79.2 |
| 6,832,581 B1 | 12/2004 | Vaugn | |
| 7,523,720 B1 | 4/2009 | Lecy | |
| 7,543,551 B2 * | 6/2009 | Stampoultzis | 119/850 |
| 7,975,656 B2 * | 7/2011 | Prill | 119/850 |
| 2002/0108586 A1 * | 8/2002 | Martin | 119/850 |
| 2007/0169444 A1 * | 7/2007 | Hung | 54/80.4 |
| 2008/0092497 A1 * | 4/2008 | Chang | 54/80.2 |
| 2009/0090307 A1 * | 4/2009 | Heister | 119/821 |

* cited by examiner

*Primary Examiner* — Rob Swiatek

(74) *Attorney, Agent, or Firm* — Stuart J. West; Shaun Sluman; West & Associates, A PC

(57) ABSTRACT

A head covering that protects a dog or other animal against the intrusion of harmful things or elements such as insects, foreign matter, and weed seeds, which can enter the animal's ears, eyes, or nose and cause discomfort or damage.

10 Claims, 6 Drawing Sheets

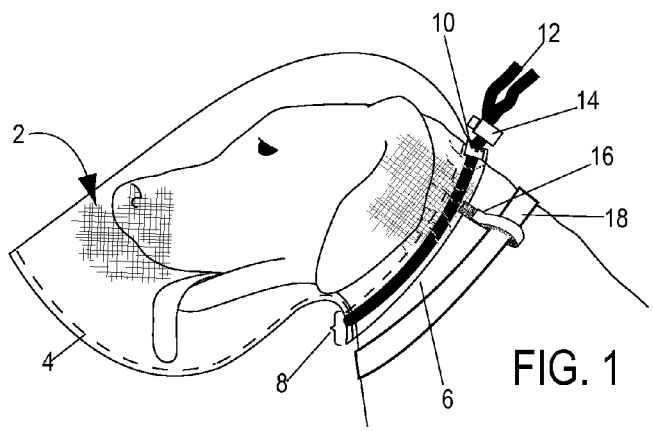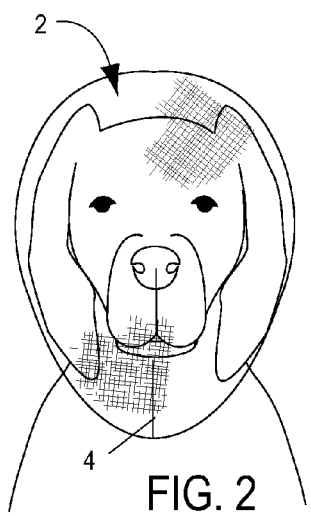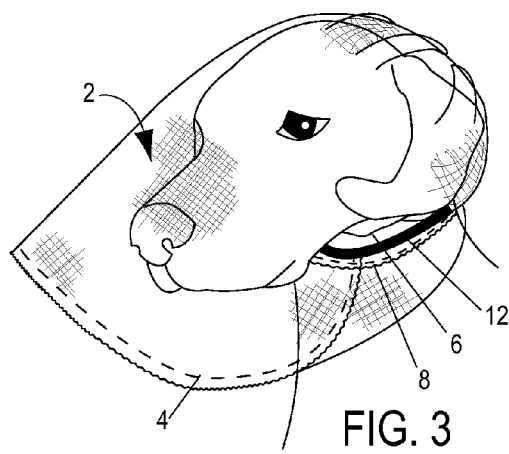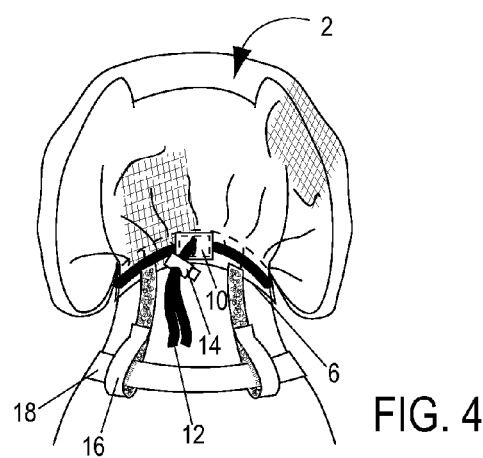
FIG. 1
FIG. 2
FIG. 3
FIG. 4

PROTECTIVE HOOD FOR DOGS AND OTHER ANIMALS

BACKGROUND

1. Field of the Invention

This invention relates generally to accessories for domestic animals, and more particularly to a head covering that protects against the intrusion of such things as insects, foreign matter, and weed seeds (also known as "foxtails"), from entering the animal's ears, eyes, or nose.

2. Background

Weed seeds, and particularly the grass seeds that are often referred to as "foxtails", have barbs that cause the seeds to attach themselves on passing animals. Foxtails imbed painfully in ear canals, nostrils, and eyes. As the animal shakes its head, sneezes, and paws its face, trying to expel the seed, the seed only goes deeper because of the one-way barbs. Within minutes, the seed has gone so deep that the seed must be removed by a veterinarian, under anesthetic, at great cost to the owner and pain to the animal.

Several products currently exist that attempt to solve this problem, but they are either ineffective or have significant flaws. Blessing's protective bonnet for animals (U.S. Pat. No. 3,753,334 to Blessing, Aug. 21, 1973) is designed to protect eyes and ears from insects, but not the nose or mouth. The present invention protects the nose and mouth in addition to the eyes and ears because it encloses the entire head.

Waltz and Davidson (U.S. Pat. No. 1,004,507 to Waltz, Sep. 26, 1911 and U.S. Pat. No. 5,367,706 to Davidson, Nov. 29, 1994) both designed head enclosures for people to keep the insects away from the face. Both have stiffening ribs to hold the net away from the face. The stiffening ribs cause a visual distraction, which can be especially annoying to an animal and can cause it to be less tolerant of the enclosure. By contrast, the present invention can be made from a fabric stiff enough to stand away from the face without the added stiffening ribs, and therefore there can be no visual distraction for the animal. When made of stiff mesh fabric, the protective hood can stand away from the face, therefore not irritating the animal by touching its face. Because of the lack of visual distraction and facial irritation, the animal could be more willing to wear the device. Finally, construction of the present invention can be simpler and more economical to manufacture without the added stiffening ribs of Waltz and Davidson.

Vaughn's Inhalation Net (U.S. Pat. No. 6,832,581B1 to Vaughn, Dec. 21, 2009) protects only the nose and its construction is very complex. The present invention protects the eyes, ears, nose, nostrils and mouth from the intrusion of insects, foreign matter, and weed seeds. Also, because the construction can be very simple, it can be economical to manufacture. In some embodiments, the present invention uses one piece of mesh fabric, to form a hood that can be gathered with a piece of adjustable elastic at a rearward opening end. Vaughn's Inhalation Net could cause discomfort and distraction to the animal because it is secured to the animal's muzzle with a piece of elastic that wraps around the lower jaw. The present invention can be designed with as much comfort as possible and therefore little distraction for the animal wearing it. It can be sized larger, longer and wider than the head, so that it doesn't touch the face, and can be shaped so that it has enough room for the animal to pant and drink (through the mesh), and can be secured gently with elastic around the neck in a fashion that is similar to the animal's own collar. There could be no visual distractions because any seams are generally out of the animal's line of sight and the mesh can be easy to see through. Though the present invention can be made in any color mesh, in some embodiments it can be black, which generally doesn't reflect light and thereby reduces distracting glare.

Finley and Harris' Protective Ear Canal Covering for dogs and other animals (U.S. Pat. No. 5,163,272 to Finley and Harris, Nov. 17, 1992) protects only the ear canals. The present invention protects eyes, nose and mouth, in addition, to the ear canals, from the intrusion of weed seeds (including foxtails), insects and other foreign matter, lodging therein.

The Lecys' Pet Hood (U.S. Pat. No. 7,523,720 to Lynda and Duane Lecy, Apr. 28, 2009) is made of a semi-rigid mesh that can be die cut and is used to prevent an animal from biting. The present invention can be primarily used to protect the animal from the weed seeds, insects, and other foreign matter getting into its eyes, ears, nose, and mouth. The present invention is made of a flexible material and can therefore be much more easily manufactured because it does not need an expensive die created for its manufacture and is easily assembled with a simple sewing machine. Because the present invention is made of a more flexible material it is more comfortable for the animal to wear. It is conceivable that the Lecys' Pet Hood could be used to protect animals from weed seeds, insects and other foreign matter, but it would not be comfortable for the animal or as economical as the present invention.

What is needed is an apparatus to protect animals against the intrusion of such things as insects, foreign matter, and weed seeds, from entering the animal's ears, eyes, or nose that can be easily manufactured and is comfortable for the animal to wear than current products. In some embodiments, the apparatus should be flexible and free of distracting or uncomfortable stiffening ribs and/or seams.

SUMMARY OF THE INVENTION

Accordingly, several objects and advantages of my invention are:

It protects an animal's entire head, including the ear canal, nose/nostrils and eyes, from intrusion of weed seeds, insects and other foreign matter, therefore avoiding pain and suffering of the animal and costly visits to the veterinarian.

It is easily worn by an animal and comfortable so therefore is more acceptable to the animal who will be more willing to wear it & much less likely to try to take it off. The protective mesh hood is shaped and sized so that the fabric generally doesn't touch face and the elastic does not need to be tight to secure the hood in place around the neck. Pets are accustomed to collars around their necks so securing the hood around the neck will be the least irritating way of securing the hood and the elastic length is adjustable if an animal changes in size. Also, the animal can see, pant, drink, and bark while wearing the protective mesh hood and it is not visually distracting since the seams are out of the animal's line of sight and the mesh is easy to see through.

The invention is easy for a pet owner to use because the elastic fastening and adjustment is easily accessed on the back of the animal's head. Once the elastic is drawn up, adjusted for the particular animal and secured with the cord lock, the protective mesh hood can easily be slid on and off without having to release and re-adjust the cord-lock each time. Optional hook/loop fastener straps to prevent animal from removing the protective mesh hood are made to quickly and easily wrap and secure around the animal's own collar.

The simple design is easy to manufacture and made of common, inexpensive materials. Further objects and advantages of my invention will become apparent from a consideration of the drawings and ensuing description of it.

BRIEF DESCRIPTION OF THE DRAWINGS

FIG. 1 An elevation that shows the head of the animal with the protective mesh hood in place.

FIG. 2 A front view that shows the head of the animal with the protective mesh hood in place.

FIG. 3 A perspective view that shows the head of the animal with the protective mesh hood in place.

FIG. 4 A back view that shows the head of the animal with the protective mesh hood in place, illustrating the back of the hood with the hook/loop fastener straps that secure it to the animal's own collar.

FIG. 8 A perspective view of a modification, illustrating an additional piece of mesh at front end of the apparatus that creates a rounded shape at top, front end of apparatus.

FIG. 9 A back view of a modification that shows the head of the animal with the protective mesh hood in place, illustrating the back of the hood without straps that secure it to the animal's own collar.

FIG. 10 An elevation of an alternate embodiment of the apparatus showing wide elastic sewn directly to the screen mesh, rather than elastic being fed through a casing.

FIG. 11 An elevation of an alternate embodiment of the apparatus that shows a separate casing made of a non-mesh fabric that can be sewn onto the opening end of apparatus.

FIG. 12 An elevation of an alternate embodiment of the apparatus that shows the back of hood made out of a non-mesh fabric.

FIG. 13 An elevation of an alternate embodiment of the apparatus that shows possible placement of extra seams throughout the protective mesh hood. All seams are placed out of animal's line of sight.

FIG. 14 An elevation of an alternate embodiment of the apparatus that shows it without the reinforced opening or the cord lock.

FIG. 15 An elevation of an alternate embodiment of the apparatus that shows it without elastic and without the cord lock.

FIG. 16 Side (FIG. 16a) and back (FIG. 16b) views of an embodiment that shows an opening at the top of the protective mesh hood for the erect types of ears, in which a separate gathered piece of can be inserted and stitched to enclose the ears.

FIG. 17 Side (FIG. 17a) and back (FIG. 17b) views of an embodiment that shows the addition of extra fabric to the protective mesh hood that creates extra room at the top of the mesh hood for the erect types of ears that can be shaped with darts at the back of the hood.

FIG. 18 An elevation of an alternate embodiment of the apparatus that shows it with a narrow type of material threaded through several, evenly spaced holes, and reinforced at the opening end of the protective mesh hood.

FIG. 19 An elevation of an alternate embodiment of the apparatus that illustrates how the protective mesh hood could be made of one single piece of mesh, suitably shaped to animal's head using folded darts, pleats or gathers and then secured with stitching to a buckled collar.

DETAILED DESCRIPTION

Referring to FIG. 1, a protective hood 2 can be configured and designed to protect an animal from insects and foreign matter by enclosing the entire head in mesh material. Mesh material can be comprised of vinyl coated polyester threads but may be comprised of any material that has the correct size openings between the threads. The threads can be woven together to create openings between threads that can block foreign matter and insects from entering a hood 2, while allowing visibility and air circulation through openings to animal. In some embodiments, mesh material can have antibacterial and/or ultraviolet protective coating and/or inherent properties. In yet other embodiments, a hood 2 can be coated or sprayed with insect repellant.

Figure 6:
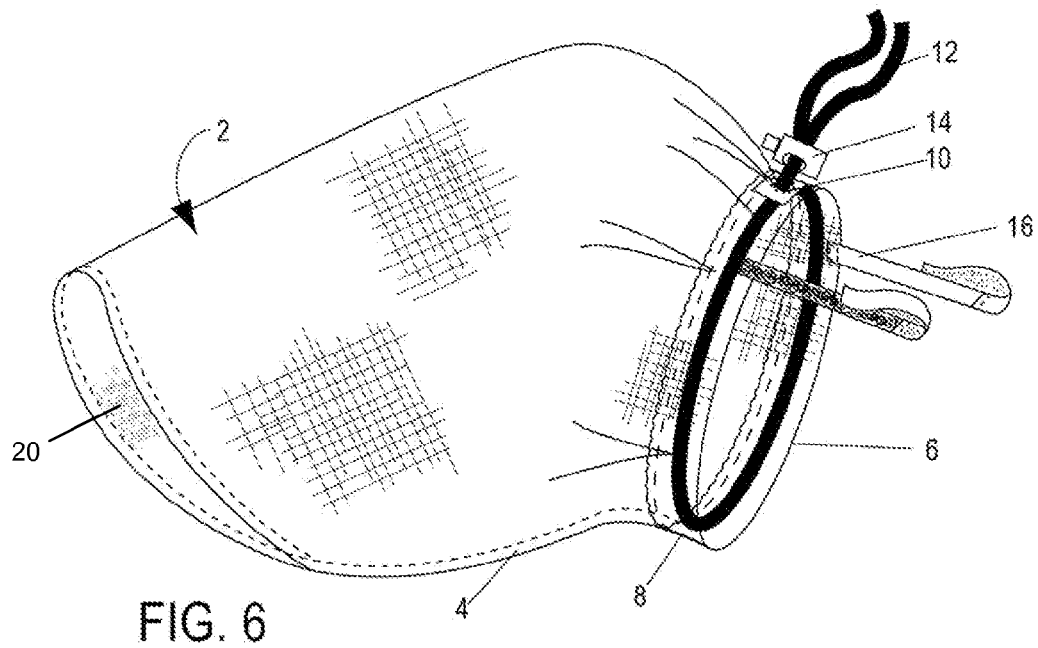
FIG. 6 A flat side view of the hood only, without opening end gathered.
Figure 7:
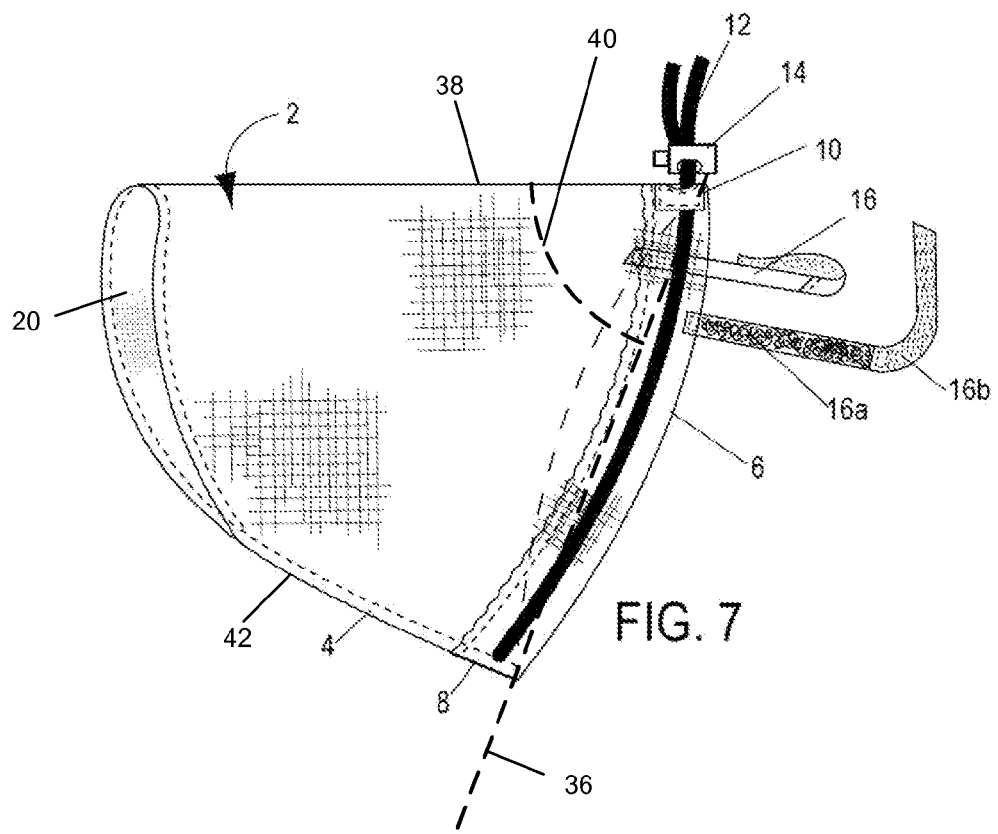
FIG. 7 A side view of the hood only, with opening end gathered to fit neck.
Figure 8:
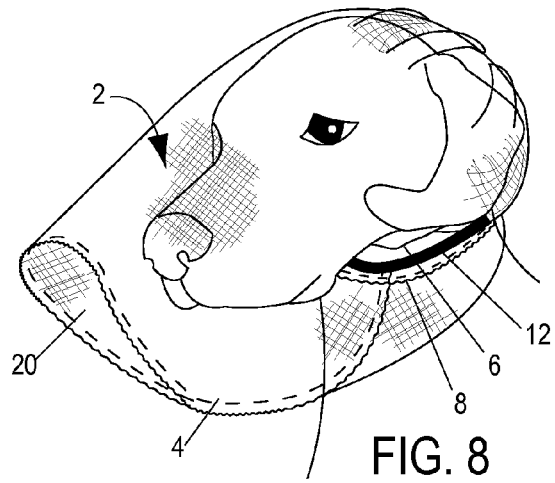
FIGS. 8 through 19 show alternate embodiments, but are not limited to only these embodiments of the protective mesh hood.

A hood 2 can reflect the shape of an animal's head and can be larger than the circumference of the animal's head. The size of a hood 2 can be designed larger than an animal's head so that there can be space between the material and all around the animal's head. This is for the animal's comfort and to allow the animal room to open its mouth and pant. In some embodiments, the material that comprises the hood can be shaped by having at least one seam 4. FIG. 1 depicts an embodiment in which only one seam 4 is used, but see FIGS. 6-8, 12 and 13 for embodiments utilizing multiple seams 4. FIGS. 6-8 depict embodiments comprising a gusset 20 that can add additional room for an animal's head and/or can provide added structural support to a hood 2. A gusset 20 can be coupled with the rest of a hood 2 via a seam 4. A seam 4 can be stitched, as depicted in FIG. 1, or can be bonded using adhesive or any other known and/or convenient bonding process. In alternate embodiments, a hood 2 can be molded using other methods such as heat formation (such as placing a piece of mesh over a mold of preferred shape and heating it to conform to shape).

Referring to FIGS. 1, 3 and 4, an opening end 6 of a hood 2 can be greater than largest circumference of an animal's head so as to facilitate easy placement of a hood 2 over the animal's head. An opening end 6 can then be gathered to the size of the animal's neck. Gathering can be accomplished through utilization of an elongated member 12, drawn up within a casing 8, drawn through a reinforced opening 10 in the casing 8, and secured by a cord lock device 14. In some embodiments, an elongated member 12 can be elastomeric. In alternate embodiments, an elongated member 12 can be any other type of material shaped in a long thin strip, such as cording or strapping that can be drawn up within the casing 8 and secured by a cord lock device or tied.

FIG. 6 shows an embodiment of a hood 2 in a deformed configuration with the neck opening 6 gathered together as it would be around an animal's neck, although the animal itself is not shown. FIG. 7 shows the embodiment of FIG. 6 in an undeformed configuration as it would appear when not being worn around an animal's head and neck, with the neck opening 6 not gathered together. FIGS. 6 and 7 depict perspective views to show a gusset 20 at the front of the hood 2, however other embodiments without a gusset 20, such as those shown in FIGS. 1-4, can have substantially similar deformed and undeformed configurations as those shown in FIGS. 6 and 7.

As shown in FIG. 7, the borders of the neck opening 6 can define a plane 36. The plane 36 of the neck opening 6 as it would be seen in a non-perspective side view is represented by a straight dashed line extending through the top and bottom of the neck opening 6 in FIG. 7. The hood 2 can have a top edge 38 that extends away from the plane 36 of the neck opening 6. As can be seen in FIG. 7, the top edge 38 can extend away from the plane 36 of the neck opening at an acute angle 40. The top edge 38 can be the upper limits of the hood 2 as it is seen from a side view. In some embodiments, the top edge 38 is not a side edge of the hood's mesh material, but is the top surface of the hood 2 as it extends from the neck opening 6 to the tip of the hood 2. By way of a non-limiting example, as seen in FIG. 7 the hood's mesh material can be a single piece that extends from the seam 4 up one side of the hood to the top edge 38 and then back down the opposite side of the hood 2 to join with itself at the seam 4, such that the top edge 38 is proximate to a center line of the mesh material.

A seam 4 can be proximate to a seam edge 42 that extends at least partially along the underside of the hood 2, substantially opposite to the top edge 38. In the embodiments shown in FIGS. 6-8, the seam edge 42 can extend from the bottom of the neck opening 6 along the underside of the hood 2 to the gusset 20. In other embodiments, such as those shown in FIGS. 1-4, a seam edge 42 can extend from the bottom of the neck opening 6 along the underside of the hood 2 proximate to the seam 4 until it meets the top edge 38 at the tip of the hood 2.

Figure 11:
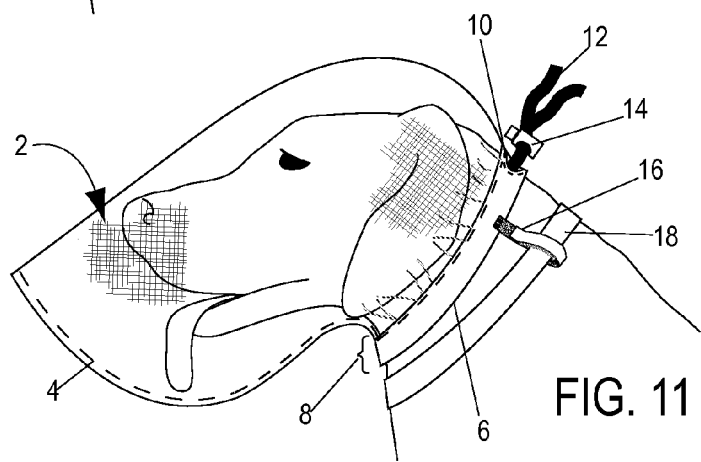

A casing 8 at the opening end 6 of a hood 2 can be formed by folding the mesh material of a hood 2 and then stitching the material back onto itself to secure the edge to a hood 2. In other embodiments, a casing 8 can be a separate component that can be formed separated and subsequently coupled with a hood 2 (see FIG. 11). In such an embodiment, the material of a casing 8 can be different from that of a hood 2. In yet other embodiments, a casing 8 and a hood 2 can be made of substantially the same material.

Figure 5:
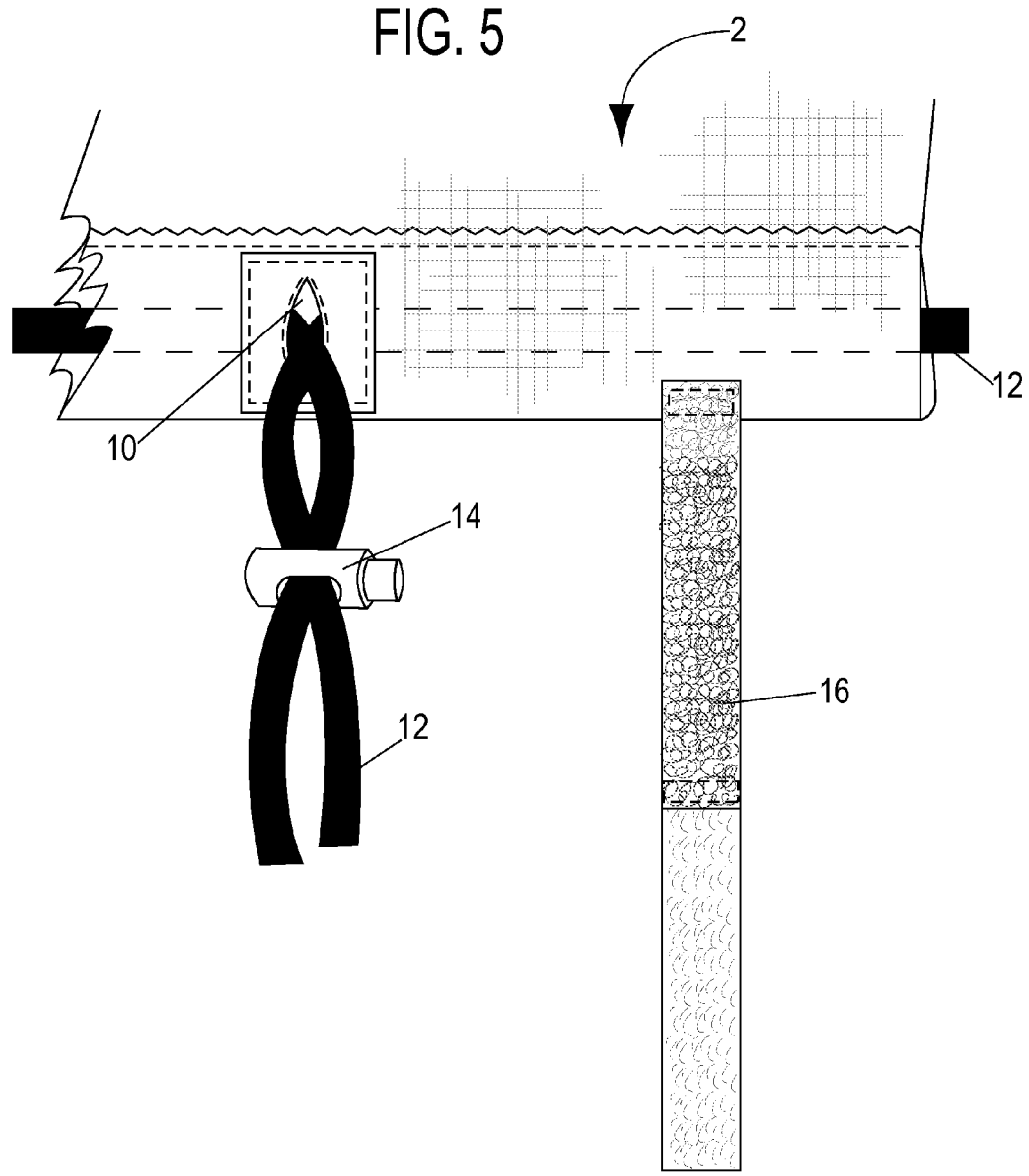
FIG. 5 A construction detail of hood opening casing, showing the reinforced opening, the elastic with the cord-lock adjuster and hook/loop fastener straps.

Referring to FIG. 5, a casing 8 can be any width that is large enough for an elongated member 12 to move through easily. A casing 8 can enclose an elongated member 12 that can be any width that can be accommodated by a cord lock device 14. A casing 8 comprise a small reinforced opening 10 to allow exit of an elongated member 12, which then can be threaded through a cord lock device 14 to secure the length of an elongated member 12 to a size that fits the animal's neck, just behind the ears. The loose ends of an elongated member 12 can hang freely, as shown in FIGS. 1 and 4, and/or each end can be knotted and/or folded or stitched onto itself to prevent passage through a cord lock device 14. In other embodiments, the loose ends of an elongated member 12 can be coupled together via tying, gluing, stitching, rivets, or any other known and/or convenient method of coupling.

An opening 10 can be reinforced by any known and/or convenient method, including stitching similar to how a buttonhole is typically reinforced, or with a small piece of closely woven fabric glued or otherwise bonded around the opening 10. In other embodiments, an opening 10 can be reinforced with grommets or any other known and/or convenient reinforcement mechanism or method.

Referring to FIGS. 1 and 5, to prevent an animal from taking a hood 2 off, straps 16 can be coupled with an opening end 6 and can be adapted to temporarily couple with an animal's own collar 18. Straps 16 can be made of hook and loop fastener material or any known and/or convenient flexible material. In the embodiment depicted, straps 16 have a long, narrow shape, but in other embodiments, straps 16 can have any other known and/or convenient geometry. Straps 16 can be positioned substantially perpendicular to an animal's collar 18, and can be long enough to wrap and secure around the collar 18. Straps 16 can be coupled with a collar 18 via stitching, adhesive, rivets, snaps or any other known and/or convenient method of permanent or temporary attachment. Similarly, the ends of a strap 16 can be adapted to couple with each other temporarily and selectively via adhesive, snaps, hook and loop mechanism, buckle, or any other known and/or convenient fastening mechanism.

Figure 9:
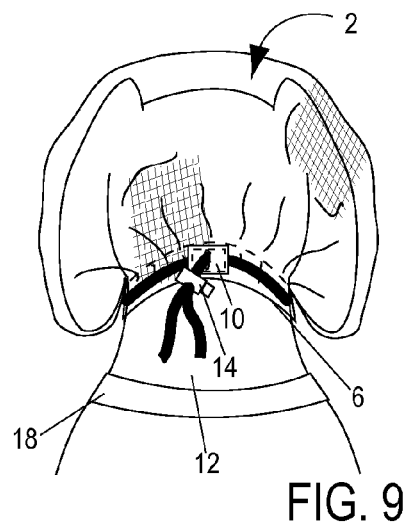

An alternate embodiment of a hood 2 is shown in FIG. 9. Since many animals may not have the ability to, or can be trained not to, take off a hood 2, in some embodiments straps 16 can be eliminated.

Figure 14:
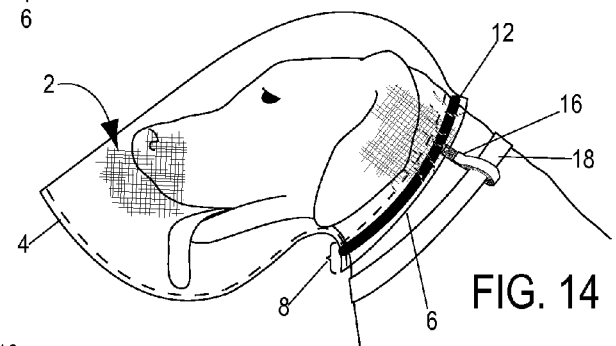

An alternate embodiment of a hood 2 is shown in FIG. 14. In the embodiment shown, a casing 8 does not have an opening 10 or cord lock device 14. Instead, an elongated member 12 can form a loop and can made of elastomeric material substantially the circumference of an animal's neck such that, in use, a hood 2 can fit closely around the animal's neck without applying too much pressure and/or causing strangulation or discomfort.

Figure 10:
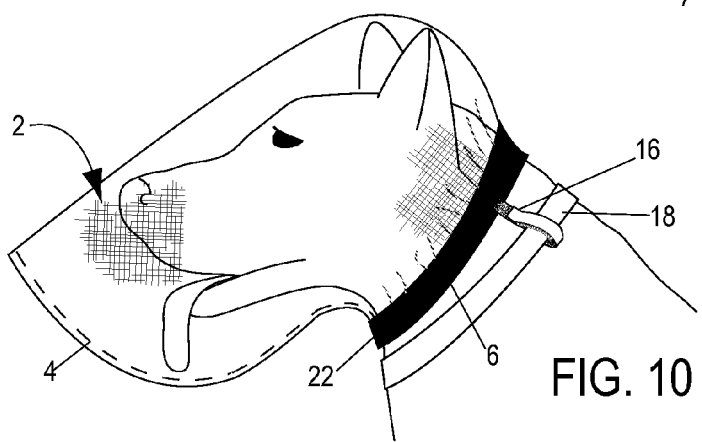
Figure 15:
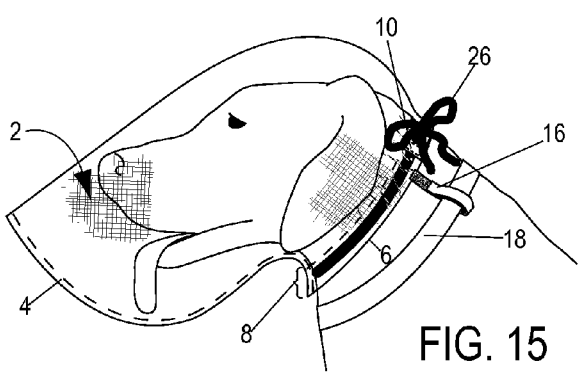
Figure 18:
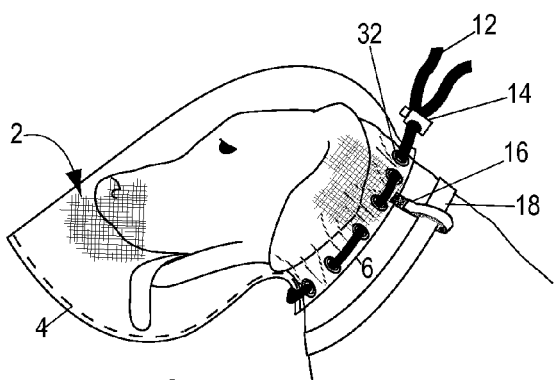

In some embodiments, a hood 2 may not have a casing 8. Instead, as shown in FIG. 10, a piece of elastomeric material 22 can be secured directly to the opening end 6 edge of a hood 2 via stitching, adhesive, snaps, or any other known and/or convenient mechanism. In other embodiments, as shown in FIG. 18, an elongated member 12 can be threaded through several holes 32 located proximate to the opening end 6 of a hood 2, such that when an elongated member 12 is drawn up, an opening end 6 is gathered and tightened around an animal's neck. An elongated member 12 can be secured in a drawn position via a cord lock device 14, by tying the ends, or by any other known and/or convenient method. FIG. 15 depicts an embodiment in which an elongated member 12 is secured without the aid of a cord lock device 14.

Figure 19:
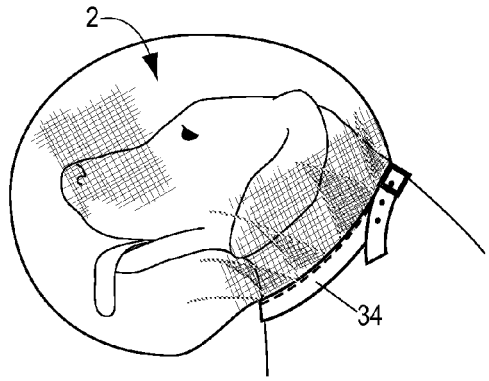

In some embodiments, a hood 2 can be secured around an animal's head and neck without the use of an existing collar 18. FIG. 19 depicts an embodiment in which a hood 2 is coupled with a built-in collar 34. In this embodiment, a collar 34 can be tightened and secured around an animal's neck via a buckle mechanism or any other known and/or convenient tightening and fastening mechanism. A collar 34 can be made of nylon, leather, or any other known and/or convenient material. In some embodiments, a collar 34 can at least partially comprise reflective coating and/or material and/or battery or solar-powered lights so as to provide increased visibility of the animal in the dark.

Figure 12:
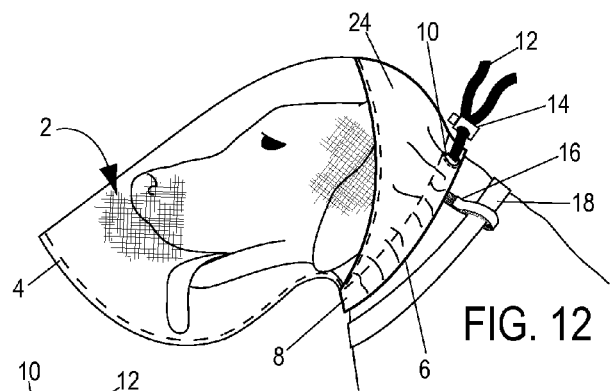
Figure 13:
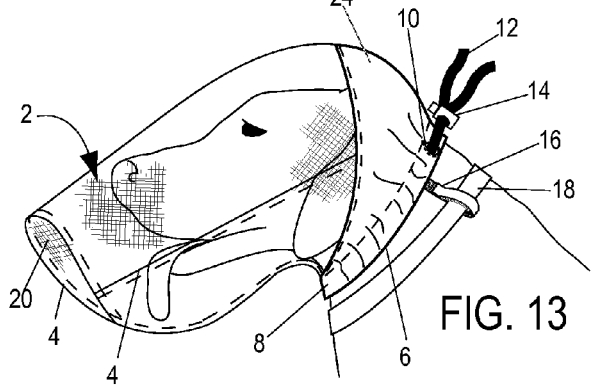

Although FIGS. 1-4, 6-7, 9-11 depict a hood 2 substantially made of one piece of material and one seam 4, in some embodiments, a hood 2 can comprise a plurality of sections and seams 4. As depicted in FIGS. 12-13, parts of a hood 2 that are out of the line of sight of an animal can be made out of different material. In the embodiments depicted, sections 24 are comprised of more closely woven material that can provide further protection, reinforcement, and/or sun blockage. Sections 24 can be coupled with a hood 2 via stitching, adhesive, or any other known and/or convenient method of bonding at a seam 4.

Figure 16A:
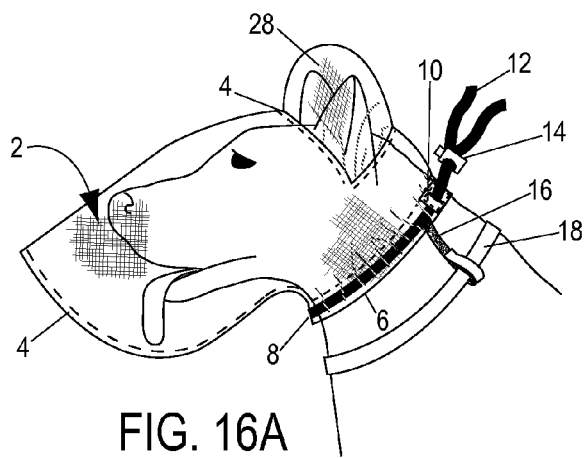
Figure 16B:
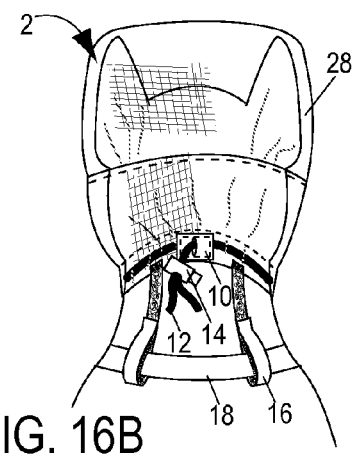
Figure 17A:
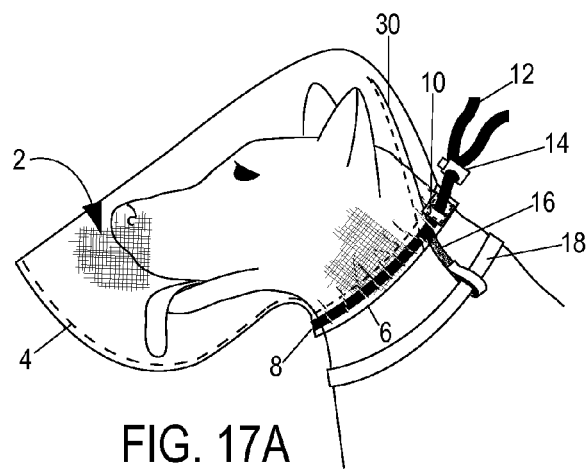
Figure 17B:
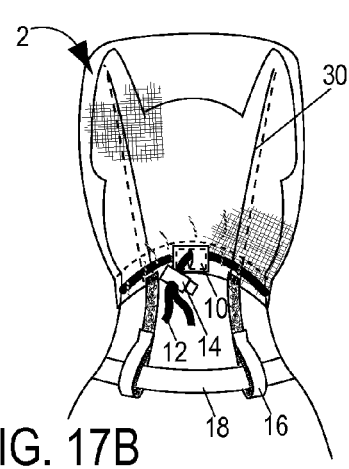

FIGS. 16-17 depict embodiments in which a hood 2 is designed to fit animals with erect ears. In FIGS. 16A-16B, an ear section 28 can be coupled with a hood 2 and can be adapted to accommodate the height of an animal's erect ears. In FIGS. 17A-17B, a hood 2 can comprise darts 30 to create extra room at the top of the hood 2 for erect ears.

Referring to FIG. 1, in use, a pet owner can hold a hood 2 with a seam 4 facing the ground, and an opening end 6 substantially perpendicular to the ground and facing away from the owner and toward an animal. The owner can then guide an opening end 6 over the animal's head beginning at the animal's nose, and then progressing over the ears, to finally lay behind the ears on the animal's neck. The opening end 6 can then be secured around the neck by drawing up an elongated member 12 and securing it with a cord lock device 14. Straps 16 can then be wrapped around the animal's own collar and secured at a length that is comfortable for the animal. In other embodiments, other methods of application and use can be employed, depending on user preference, hood 2 structure and design, and type and size of animal.

Although a hood 2 has been described for use as a protective enclosure to keep pests or other harmful objects away from an animal's head, in some embodiments a hood 2 can be used to protect other people or animal's from the animal wearing the hood 2 by preventing biting, spread of disease, or other harmful activity by the animal. In yet other embodiments, a hood 2 can be used as a barrier to deter an animal from licking itself, irritating a wound, or interfering with a bandage or sutures after surgery or other medical procedures. A hood 2 can also prevent an animal from eating things it shouldn't, such as feces, plants, or other potentially harmful substances.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed is:

1. A protective device for animals, comprising:
   a hood having an enclosed head portion defined by a mesh member that is configured to allow visibility through said hood, wherein said hood has:
      a first edge extending along the top of said hood,
      a seam edge extending along the underside of said hood, and
      a neck opening that is open into the interior of said enclosed head portion; and
   an elongated member coupled with said hood proximate to said neck opening, said elongated member having a length at least as great as the circumference of an animal's neck,
   wherein in an undeformed configuration, said first edge extends away at an acute angle from a plane defined by said neck opening, and
   wherein said hood is configured to accept said animal's head through said neck opening to fully enclose said animal's head inside said hood on all sides when said hood is worn around said animal's head and said hood has been moved from said undeformed configuration into a deformed configuration such that the boundaries of said neck opening are in contact with said animal's neck.

2. The protective device of claim 1, wherein said hood further comprises at least one darted portion adapted to allow room at the top of said hood for said animal's erect ears.

3. The protective device of claim 1, wherein the top of said hood further comprises at least one raised ear section adapted to accommodate said animal's erect ears.

4. The protective device of claim 1, further comprising a casing coupled with said hood proximate to said neck opening, wherein said casing houses said elongated member.

5. The protective device of claim 4, wherein said casing further comprises a reinforced opening adapted to allow at least one end of said elongated member to pass through.

6. The protective device of claim 1, wherein said elongated member is coupled with a fastening mechanism.

7. The protective device of claim 1, further comprising a gusset coupled with said hood, wherein said gusset is positioned substantially opposite to said neck opening.

8. The protective device of claim 1, wherein said hood is shaped such that when said hood is worn around said animal's head there is space between said hood and all sides of said animal's head and contact between said animal's neck and said hood at said neck opening.

9. The protective device of claim 1, wherein said hood is shaped such that when said hood is worn around said animal's head there is space between said hood and at least some sides of said animal's head and contact between said animal's neck and said hood at said neck opening.

10. The protective device of claim 1, further comprising one or more straps coupled with said hood proximate to said neck opening, wherein said straps are configured to be coupled with a collar positioned around said animal's neck.

* * * * *